Aug. 18, 1959
C. E. NORRIS
2,899,939
VALVE DEVICE HAVING ARRANGEMENT FOR PREVENTING
EXTRUSION OF O-RING SEALS ON VALVE ELEMENT
Filed June 24, 1957
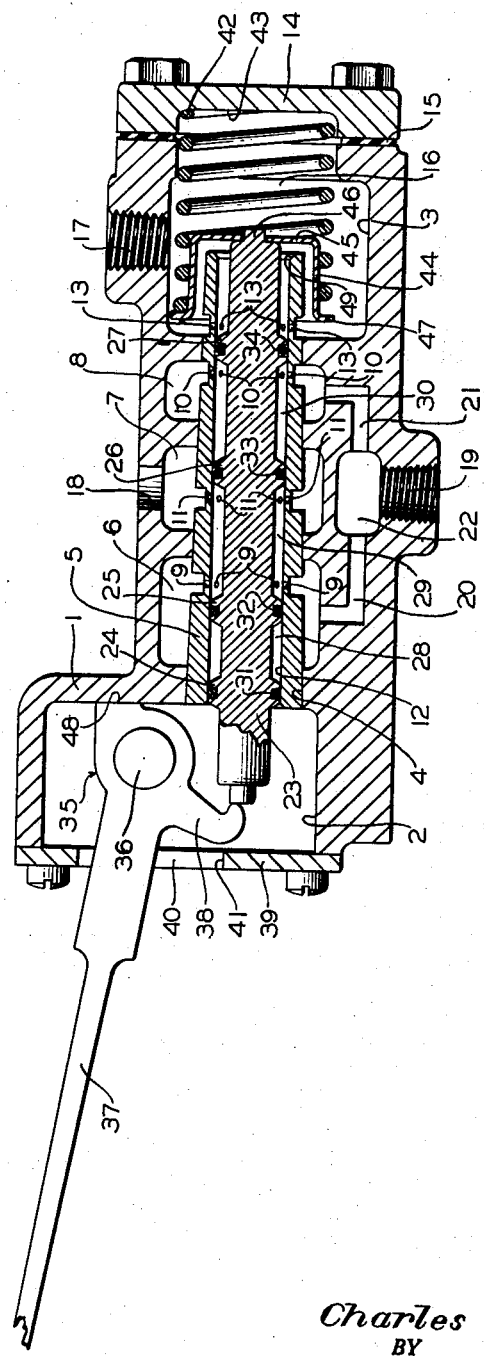
INVENTOR.
Charles E. Norris
BY
Adelbert O. Steinmiller
ATTORNEY

United States Patent Office 2,899,939
Patented Aug. 18, 1959

2,899,939

VALVE DEVICE HAVING ARRANGEMENT FOR PREVENTING EXTRUSION OF O-RING SEALS ON VALVE ELEMENT

Charles E. Norris, West Mifflin, Pa., assignor to Westinghouse Air Brake Company, Wilmerding, Pa., a corporation of Pennsylvania Application June 24, 1957, Serial No. 667,331

2 Claims. (Cl. 121—46.5)

This invention relates to valve devices and more particularly to improvements in valve devices of the kind employing annular elements of resilient material as sealing members for controlling supply and release of fluid under pressure to and from a device to be controlled or actuated.

Valve devices of the type to which this invention relates are ones in which there is a relative passing over of resilient annular sealing members and ports in an apertured member and in which the parts are so arranged that, during such passing over, the sealing members are never subjected to a fluid pressure which would tend to extrude them into the ports but rather become subjected to fluid pressure which tends to force these sealing members away from the edges of such ports to protect them from being cut or abraded by contact therewith.

Known prior art devices of the above type are characterized by the disposition of the annular sealing members in fixed positions within a casing and disposition of the ports in a member movable relative to the sealing members. This arrangement is particularly undesirable inasmuch as the sealing elements, being in fixed positions within the casing, are not readily accessible for examination and/or replacement and therefore much time-consuming effort is involved in order to accomplish such act or acts. It becomes, therefore, a prime object of the present invention to provide a simplified valve device of the above general type in which the resilient sealing members are readily accessible for assemblage, inspection, and/or replacement, thus greatly enhancing the practical value of these valve devices.

The above object is attained in the present invention by provision of a fixed member having a specific arrangement of axially spaced-apart valve ports, including supply, exhaust and interconnected dual delivery ports, which enables a suitable number of the annular sealing members to be mounted on a spool-type valve element which may be readily removed to render such sealing members easily assembled and accessible for inspection or/and replacement.

Other objects and advantages of the invention will become apparent from the following more detailed description of such invention when taken in connection with the accompanying drawing in which the single figure is a longitudinal sectional view of the novel valve device illustrating the spool-type valve in its release position.

Description

Referring to the drawing, the improved valve device embodying the invention comprises a casing 1 having cavities 2 and 3 at opposite ends thereof, and a bore 4 extending between these cavities. The bore 4 serves to accommodate a bushing element 5 which is press fit therein and extends from the cavity 2 through said bore into the cavity 3. The bore 4 and the outer peripheral surface of the bushing element 5 are preferably tapered or, in other words, of frusto-conical shape to assure that said bushing element will be disposed in its proper longitudinal position within the casing 1 when press fit into the bore.

The casing 1 is provided with three annular grooves 6, 7 and 8 which open radially outward from the bore 4 at axially spaced-apart intervals with respect thereto, and the interior of the bushing element 5 is opened to these grooves at axially spaced-apart intervals by two groups of circumferentially arranged delivery ports 9 and 10, and intermediate exhaust ports 11 which open radially outward from the inner cylindrical surface 12 of said bushing element to the exterior thereof and into the surrounding grooves 6, 7 and 8, respectively. A fourth set of circumferentially arranged supply ports 13 opens the interior of the inner cylindrical surface 12 of the bushing element 5 to the interior of the cavity 3.

The cavity 3 is closed by an end cap 14 suitable sealed by means of a gasket 15 to define an end wall of a supply chamber 16 within the cavity 3, and the casing is provided with a supply opening 17 which is threaded to adapt same for connection to a source of fluid under pressure via a supply pipe or conduit (not shown).

The annular groove 7 in the casing 1 is constantly open to the atmosphere by way of an exhaust opening 18, while the annular grooves 6 and 8 at opposite sides of said annular groove 7 are open to a delivery opening 19, common to each, by way of passageways 20 and 21, respectively, and a delivery chamber 22. The delivery opening 19 is threaded to adapt same for connection to pipe or conduit means (not shown) and thereby to a device (not shown) to be actuated or controlled by fluid under pressure.

For controlling selective communication between the delivery opening 19 and either the exhaust opening 18 or the supply opening 17, a spool-type valve element 23 is provided which extends from the cavity 2 through the bushing element 5 into the pressure chamber 16. Valve element 23 comprises four axially spaced-apart annular lands 24, 25, 26 and 27 which are in slidably guided cooperation with the inner cylindrical surface 12 of the bushing 5. Formed intermediate lands 24 and 25 is an annular chamber 28, between lands 25 and 26 is an annular chamber 29, and between lands 26 and 27 is an annular chamber 30. Mounted in suitable grooves in the lands 24, 25, 26 and 27 are resilient annular sealing members 31, 32, 33 and 34, respectively, for slidable sealing cooperation with the inner cylindrical wall 12 of the bushing element 5. Such resilient annular sealing members are preferably of the well-known O-ring configuration.

For actuating the spool-type valve element 23 to its supply position, a cam 35 is provided which is disposed in the cavity 2 and pivotally connected to the casing 1 through the medium of a shaft 36. As shown in the drawing, the cam 35 is adapted to be rocked about the axis of the shaft 36 by a lever 37 which, for example, may be in the form of a foot pedal, and which is secured to the cam 35 such as by integral connection therewith. The cam 35 is provided with a finger element 38 adapted for contact with the end of the valve element 23 projecting into the cavity 2 such that by rocking movement of the cam 35 in a counterclockwise direction, as viewed in the drawing, about the axis of the shaft 36, said valve element 23 will be caused to slide within the bushing element 5 in the direction of the pressure chamber 16. A removable end cover 39 substantially closes the cavity 2 and is provided with a slot 40 through which the lever 37 extends and which is terminated at its lowermost end by a shoulder 41 which becomes contacted by a portion of said lever to define the limit of counterclockwise movement of the cam 35, and thereby defines the extent to which valve element 23 may be advanced into the bushing element 5.

For effecting return movement of the spool-type valve element 23 and of the lever 37 to the respective positions in which they are shown in the drawing, a compressed spring 42 of helical form is disposed in the pressure chamber 16 in coaxial alignment with said valve element. One end of the spring 42 is supported by the end cap 14 and suitably located within a circular recess 43 formed therein, while the opposite end of the compressed spring is connected to the respective end of the valve element 23 through the medium of a cylindrical spring seat element 44 having an integral washer element portion 45 fit onto a reduced portion 46 at the respective end of the valve element 23, and also having an outwardly extending flange portion 47 at its opposite end which is directly engaged by said spring. The extent which the spring 42, through the medium of seat element 44, may cause the valve 23 to move in the direction of cavity 2 is limited by contact of a stop surface 48 formed on part of the cam 35, with a portion of the casing 1.

*Operation*

Referring to the drawing, assume that all components of the valve device are in their respective positions in which they are shown in the drawing; that the supply opening 17 is connected to a source of fluid under pressure; that delivery opening 19 is connected to a device to be actuated or controlled by fluid under pressure.

Under such circumstances, the compressed spring 42 holds the spool-type valve element 23 in its release position as defined by engagement of the stop surface 48 of the cam 35 with the respective portion of the casing, and, in such release position of the valve element 23, the delivery opening 19 is connected to the atmosphere by way of the delivery chamber 22, the passageway 20, the annular groove 6, the delivery ports 9, the annular chamber 29, exhaust ports 11, the annular groove 7 and the exhaust opening 18.

Assume now that it is desired to establish fluid pressure communication between the supply opening 17 and the delivery opening 19 for conveying fluid under pressure from the former to the latter for supply to a device to be actuated or controlled thereby. The lever 37 will be actuated downwardly, as viewed in the drawing, into engagement with the shoulder 41 of the slot 40 in the end cover 39.

During such movement of the lever 37 the spool type valve element 23 will be actuated in the direction of the pressure chamber 16 against opposition of the compressed spring 42 to a supply position. During such movement of the spool-type valve element 23, the annular sealing member 32 will pass over the delivery ports 9, and the annular sealing member 34 will pass over the supply ports 13. It will be noted that at the time that the sealing member 32 passes over the delivery ports 9 there is no fluid under pressure in the annular chambers 28 and 29, so that such sealing member is not subjected to any pressure force tending to extrude same into these ports, and that the sealing member 34 in passing over the ports 13 is subject to fluid under pressure from supply chamber 16 present in such ports which displaces respective portions of such sealing member away from the edges of these ports, thereby discouraging any abrasive or cutting effect which otherwise might transpire during cross-over.

Upon the sealing member 32 thus passing over the delivery ports 9, communication between the delivery opening 19 and the exhaust opening 18, as previously traced, is disestablished, while at the same time the passing of the annular sealing member 34 over the supply ports 13 establishes communication between the supply opening 17 and said delivery opening 19 by way of the pressure chamber 16, said supply ports 13, the annular recess 30, the delivery ports 10, the annular groove 8, the passageway 21, and the delivery chamber 22. At this time, in addition to pressurization of the annular groove 8, the annular groove 6 will also become pressurized by virtue of its communication with the delivery chamber 22 via the passageway 20.

Assume that it is now desired to disestablish communication between the delivery opening 19 and the supply opening 17 while at the same time establishing communication between said delivery opening and the exhaust opening 18 for release of fluid under pressure from the device to be controlled or actuated. Under such circumstances, effort exerted on the lever 37 holding same into engagement with the shoulder 41 will be relaxed to permit the compressed spring 42, acting through the medium of the spring seat element 44, to return the spool-type valve element 23, cam 35, and said lever to the respective positions in which they are shown in the drawing defined by engagement of the stop surface 48 of said cam with the respective portion of the casing. During such return movement of the spool-type valve element 23, the annular sealing member 34 will move toward the left, as viewed in the drawing to re-cross the ports 13 in which fluid under pressure from pressure chamber 16 will again urge respective portions of said sealing member away from the edges of these ports to protect same from abrasion and cutting, while the annular sealing member 32, in moving in the same direction, will re-cross the delivery ports 9 in which fluid under pressure from the annular groove 6 will urge respective portions of said sealing member 32 away from the edges of such ports also to protect this sealing member in the same fashion. Upon completion of the cross-over of the sealing member 34 to the left of the ports 13, as viewed in the drawing, communication between the supply opening 17 and delivery opening 19 via such ports 13 and the annular chamber 30 will become dis-established, while corresponding movement of the annular sealing member 32 to the left of the ports 9 re-establishes communication between the delivery opening 19 and the exhaust opening 18 by way of the delivery chamber 22, the passageway 20, the annular groove 6, the ports 9, the annular chamber 29, the ports 11, and the annular groove 7 to release fluid under pressure thereby from the device (not shown) to be controlled or actuated.

From the foregoing it will be apparent that this invention provides a valve device employing resilient annular sealing members as the active valve elements which pass over cross-drilled ports and which are protected from pressure forces tending to extrude same into such ports to thereby assure a relatively long service life of such annular sealing members. In accord with the prime feature of the invention, these annular sealing members are mounted on a spool-type valve element 23 which may be removed with ease from the casing 1 by removal of the end cap 14. This act frees the compressed spring 42 and enables the removal of the cylindrical spring seat element 44 and valve element 23 for exposure of sealing members 31, 32, 33 and 34. If necessary, the lever 37 may be rocked in the direction of the shoulder 41 to advance the valve element 23 further into the chamber 16 to better enable it to be gripped and withdrawn through the open end of cavity 3.

Subsequently, the spool-type valve element may be reinserted through the open end of the cavity 3 into the end of the bushing element 5, the cylindrical spring seat element 44 and spring 42 replaced, and the end cap 42 again secured to the casing 1. To facilitate insertion of the spool-type valve element 23 the end of the bushing element 5 which projects into the cavity 3 is provided with a tapered opening 49 joining the respective end of the inner cylindrical surface 12 of said bushing element.

Having now described the invention, what I claim as new and desire to secure by Letters Patent, is:

1. In a valve device, the combination of means defining an inner cylindrical surface having a fluid pressure supply port, a first delivery port, an exhaust port, and a second delivery port constantly open to said first delivery port, each port opening radially outward from said inner cylindrical surface in axially spaced-apart relationship in the order as recited, and a spool-type valve assemblage having four axially spaced-apart annular grooves, a resilient O-ring disposed in each of said grooves and having slidable sealing engagement with said inner cylindrical surface, a first one of said O-rings being located to pass over said supply port for controlling a supply communication from said supply port to said first delivery port, a second one of said O-rings being located to remain intermediate said first delivery port and said exhaust port to prevent connection therebetween, a third one of said O-rings being located to pass over said second delivery port for controlling a release communication between said second delivery port and said exhaust port, and a fourth one of said O-rings being located to remain between said second delivery port and the respective end of said inner cylindrical surface to isolate said release communication therefrom.

2. A valve device comprising a tubular casing member, a cylindrical bushing member supported within said casing member, said tubular casing member being formed to provide three axially spaced annular chambers surrounding said bushing member and two end chambers into which opposite ends of said bushing extend respectively, a supply opening through which fluid under pressure may be supplied to one of said end chambers, a delivery opening opening out of two of said annular chambers, and an exhaust opening opening out of the third annular chamber intermediate the said two annular chambers, four sets of radial ports in said bushing member connecting the interior of said bushing member to respective annular chambers and one of said end chambers, a spool-valve element slidable in said bushing member, said spool-valve element having four lands spaced axially therealong, each land having an annular groove therein, an O-ring in each of said annular grooves for sealing contact with the inner surface of said bushing member, biasing means urging said spool-valve element longitudinally in one direction to one position in which the said two annular chambers are connected in series with each other and the said intermediate annular chamber whereby to exhaust fluid under pressure from the device connected to said delivery opening, and means for shifting said spool-valve element in opposition to the force of said biasing means to a second position in which said intermediate annular chamber is disconnected from the said two annular chambers and said one end chamber is connected to said two annular chambers to provide communication through which fluid under pressure may be supplied from the supply port to the delivery port.

References Cited in the file of this patent

UNITED STATES PATENTS

| 2,675,024 | Clark | Apr. 13, 1954 |

FOREIGN PATENTS

| 3,144 | Great Britain | Feb. 8, 1898 |
| 21,326 | Great Britain | Oct. 25, 1899 |
| 656,622 | Great Britain | Aug. 29, 1951 |